June 6, 1939.  F. B. YINGLING  2,161,398
HYDRAULIC COUPLING
Filed July 22, 1936  3 Sheets-Sheet 1

Inventor
FRANK B. YINGLING
By Chas K. Davis + Son
Attorney

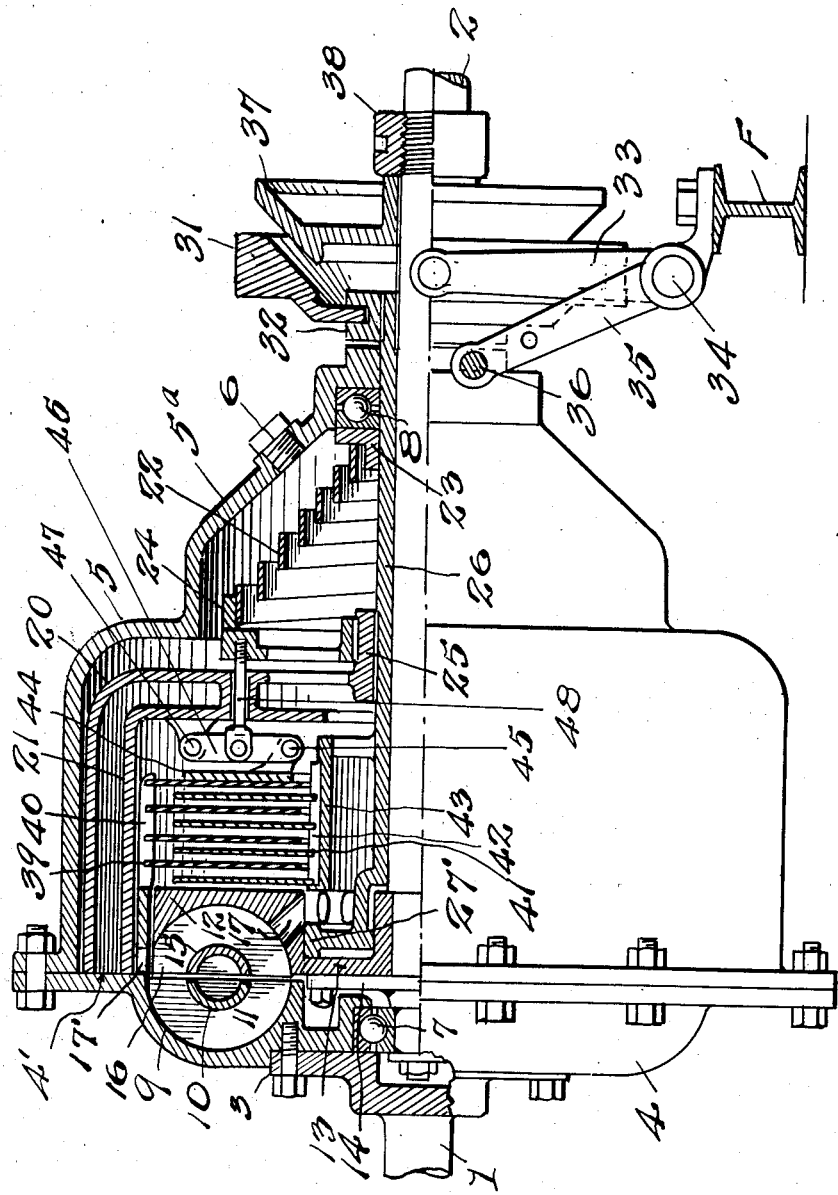

June 6, 1939. F. B. YINGLING 2,161,398
HYDRAULIC COUPLING
Filed July 22, 1936 3 Sheets-Sheet 3

Inventor
FRANK B. YINGLING
By Chas. K. Davies + Son
Attorney

Patented June 6, 1939

2,161,398

UNITED STATES PATENT OFFICE 2,161,398

HYDRAULIC COUPLING

Frank B. Yingling, Hamilton, Ohio

Application July 22, 1936, Serial No. 91,973

12 Claims. (Cl. 192—12)

My present invention relates to improvements in hydraulic couplings for rotary transmission and control of power between a prime mover, as a motor or an engine, and power operating mechanism, as change-speed mechanism. The hydraulic coupling of my invention provides a simple, compact, reliable, smooth-operating and quick-acting appliance, when interposed in a driving mechanism, by means of which the transmission of power may readily be manually controlled.

While the coupling of my invention may be used in various driving and other mechanisms, it is particularly adapted for use in the driving mechanism of a locomotive where the selective control of the coupling is associated with the selective control of the change-speed gearing of the driving mechanism, both controls being readily accessible to the driver or engineer of the locomotive; or the controls may be operated by electrical, pneumatic, or hydraulic means.

In such a driving assembly for a locomotive, which may include a Diesel (or other) engine and its drive shaft, the coupling and its shaft, and the change-speed gearing, a quick pick-up may readily be accomplished, with sufficient power to accelerate the load of the locomotive at the different speeds of the transmission gearing. With equal facility, the coupled parts may be disconnected, even when the engine is running at full speed as well as at a lower speed, for the purpose of releasing the load of the locomotive preparatory to selective shifting of the transmission gears or change-speed gears of the driving mechanism.

In carrying out my invention I employ a driving member or rotary impeller in the nature of a motive fluid pump that is rotated directly by power from the engine or motor; a complementary runner of the turbine type; and an interior rotary transfer casing or valve device that is longitudinally movable with relation to the impeller and the coupling shaft or driven shaft. In connection with an interior storage chamber for the motive fluid the transfer casing is adapted to receive the motive fluid, as oil, from the working chamber or vortex of the coupling, when the latter is emptied or evacuated, and also to thereafter transfer or return the oil to the working chamber for co-operation as a motive fluid with the impeller and the runner.

In combination with the hydraulic coupling I also employ a manually controlled, exterior, brake clutch, preferably of the cone type (or a band brake may be used) for controlling and arresting the rotary movement of the impelled or driven parts, including the runner, the transfer casing, and the coupling shaft and the driven shaft. In modified forms of the invention I may employ interior braking members; and also interior auxiliary clutch devices preferably of the multi-plate friction type, for the purpose of eliminating slippage between the impeller and the runner, thus enhancing the efficiency of the coupling.

The subject matter of this application is a continuation in part of the invention illustrated and claimed in my co-pending application for patent, Ser. No. 26,313, filed June 5, 1935.

The invention consists in certain novel combinations and arrangements of parts as will hereinafter be more fully set forth and claimed. In the accompanying drawings I have illustrated one complete example of the physical embodiment of my invention, and modifications thereof, wherein the parts are combined and arranged according to modes I have thus far devised for the practical application of the principles of my invention, but it will be understood that changes and alterations may be made in these exemplifying structures within the scope of my appended claims, without departing from the principles of my invention.

Figure 2 is a modified form of the invention, including an interior auxiliary friction clutch for enhancing the efficiency of the clutch.

In carrying out my invention I utilize a drive shaft 1 of a prime mover, which may be a Diesel engine, or other type of motor, and the driven shaft 2 which as previously indicated may be connected with the change-speed gearing of the driving mechanism of which the coupling forms a part.

Figure 1:
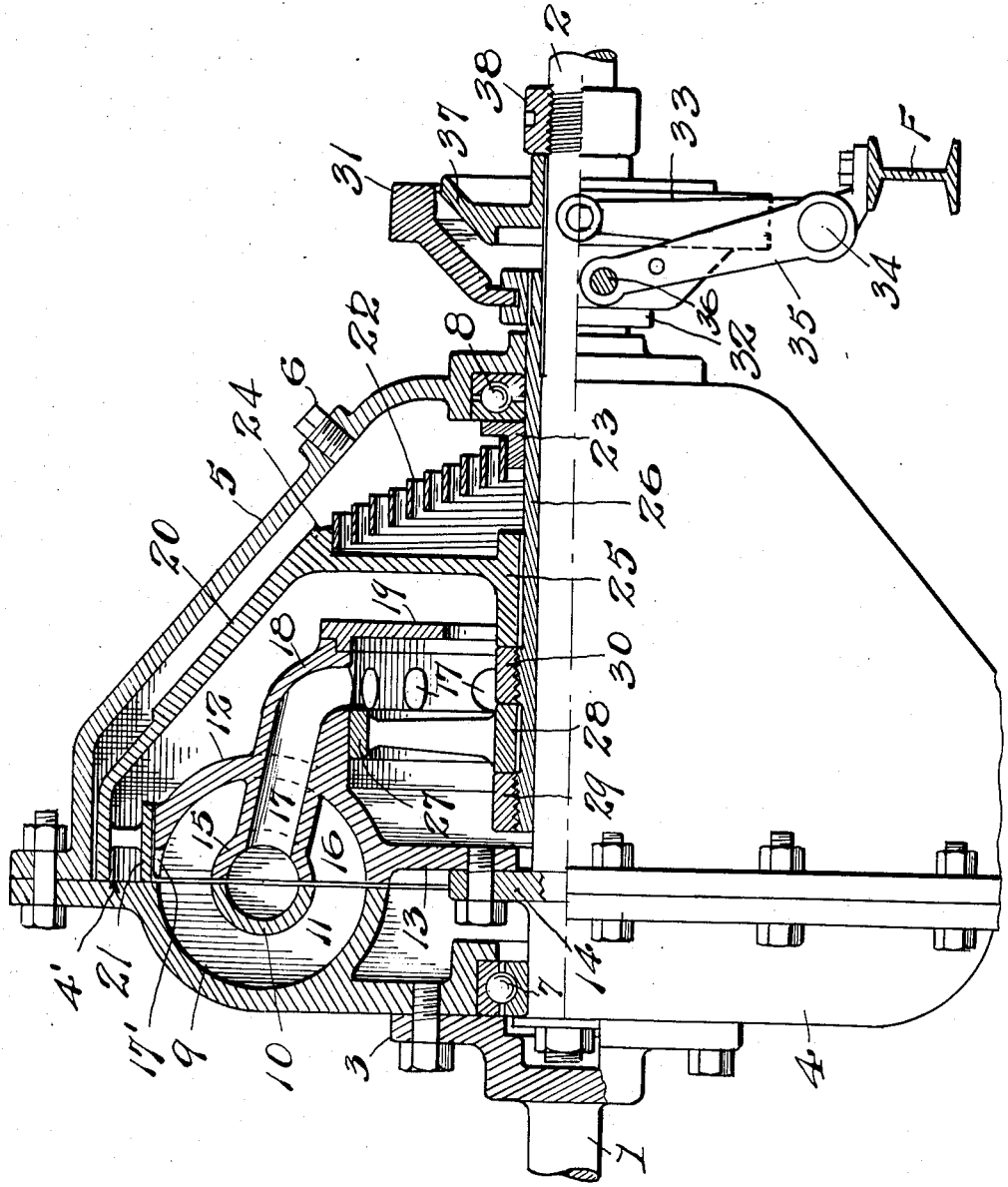
Figure 1 is a view in side elevation, partly in section, of a hydraulic coupling embodying my invention, wherein the impeller is rigid with and revolves with the exterior housing.

In Figures 1 and 2, the drive shaft is provided with an attaching head 3 that is bolted to an impeller housing 4—5, made up of flanged sections bolted together to form a somewhat frusto-conical shaped housing into which the oil or motive fluid may be introduced by removal of the filling plug 6.

The two shafts 1 and 2 are supported in suitable bearings (not shown) and the housing, rigid with the drive shaft, is journaled about the driven shaft on an end bearing 7 at the motor side of the coupling, and on a thrust bearing 8 at the driven side of the coupling. The impeller section 4 of the housing is fashioned with a semicircular, annular working space 9, dished rings 10 and vanes 11, the latter arranged in an annular series to co-operate with a dished ring in the formation of the impeller buckets.

The runner 12 located within the housing is complementary in shape to the impeller, and the runner is fashioned with an inner annular flange 13 that is bolted to a head 14 adjacent to the journaled end of the coupling shaft 2.

The integral dished ring 15 and the vanes 16 of the runner are arranged opposite to the complementary parts of the impeller, and the runner is fashioned with an annular series of ports 17 leading from the working chamber formed between the impeller and runner. These ports also extend through the wall of a cylindrical head 18 integral with or rigid with the runner and the ports are located at one side thereof concentrically of the coupling shaft. This cylindrical hollow head, together with the flange 13 of the runner, forms a storage chamber for oil or motive fluid which is in communication with the interior of the working chamber of the coupling, when the ports are open, and a closure disk 19, having an open center, is fastened rigidly in suitable manner to the circular edge of the cylindrical head forming the storage chamber.

A second, annular series of ports as 17', is provided in the outer periphery of the runner section, and these ports open radially and outwardly from the interior of the working chamber of the coupling, their function being to empty or evacuate the working chamber, while the function of the ports 17 is to fill the working chamber, or return the motive fluid thereto after evacuation of the chamber.

It will be understood that oil or motive fluid is supplied to the interior of the housing, after removal of the plug 6, in sufficient quantity to fill the working chamber 9 and other adjoining space within the housing to approximately two-thirds the capacity of the interior of the housing, and of course the plug 6 is replaced before the coupling is operated.

Power from the engine or motor revolves the drive shaft 1, the impeller-section of the housing 4, and of course the conical section 5 of the housing revolves with the drive shaft. By centrifugal force, oil is thrown from the axial center of the housing, or of the coupling, into the working chamber, through ports 17, and, due to the co-operation of the two sets of vanes 11 and 16 of the impeller and runner respectively, jointly, with the oil in the working chamber, the runner is caused to partake of the rotary movement of the impeller. This rotary movement of the runner is transmitted through the flange 13 and shaft flange 14 to the coupling shaft or driven shaft 2, and the shaft revolves suitable mechanism, as the change-speed gearing of an automotive vehicle, or of a locomotive, as the case may be.

When the driving and driven parts are thus coupled together, power is transmitted through the coupling, with the drive shaft and the driven shaft revolving at approximately the same speed, although, as is well known, a slight slippage may occur between the impeller and the runner, which tends to impair the efficiency of couplings of this type.

To uncouple the runner and driven shaft from the impeller and drive shaft, the working chamber is evacuated or emptied of the motive fluid or oil, and the oil is thrown by centrifugal force of the impeller and other revolving parts, through the outlet ports 17', which, it will be understood, are closed at 4' by parts 21 while the impeller and runner are coupled together for transmission of power.

For a substantial and quick evacuation, or for a slower evacuation, of oil from the working chamber, I employ a transfer casing 20 of frusto-conical shape conforming to the shape of the housing section 5 and enclosed therein, and this casing is fashioned in suitable manner with a valve ring 21, within and concentric with the circular rim or edge of the casing. The valve ring surrounds the ported periphery of the runner and closes the ports 17', and the free edges of both the casing and the ring frictionally engage against the smooth inner face 4' of the impeller while the driving and driven parts are in coupled position. A suitable spring 22 is interposed between a flanged spring ring 23 that abuts against the thrust bearing 8, and a confining ring 24 having a spider frame and a hub keyed on the hub 25 of the casing 20, and this spring presses the casing and valve ring against the face 4'.

The casing is fashioned with a central hub 25 that is keyed to a coupling sleeve 26, which sleeve is mounted on and keyed to the driven shaft 2 to revolve therewith, but the sleeve is also slidable longitudinally on the shaft for the purpose of moving or shifting the casing and valve ring, laterally, away from the face 4' against tension of spring 22, to uncover or open the ports 17'. When the casing and valve are thus shifted laterally, or to the right in Figure 1, the oil is free to pass through ports 17' and be transferred within casing 20, through the central opening of cap 19 into the storage chamber within the cylindrical head 18, due to the decrease of the centrifugal force that has been generated by the revolving parts.

It will be understood that there is an ample supply of oil within the coupling to fill the lower portion thereof and to enter the central portion of the coupling when the latter is disconnected, and therefore, due to the decrease in centrifugal force, when the exterior control housing 5 or 20 is retarded or stopped, the oil accumulates in the storage chambers 43 and 53 as well as in the lower portion of the coupling.

To prevent exit of oil from the storage chamber and its return to the working chamber of the coupling while the runner is uncoupled from the impeller, I employ an annular disk valve 27 in Figure 1, which may be fashioned with spokes as indicated, and is provided with a hub 28 that is mounted on the sleeve 26. This valve 27 is secured in adjusted position on the sleeve with relation to the ports 17 of the storage chamber by means of two collars 29 and 30 threaded on the sleeve 26 and of course rotatable therewith, and the collar 30 also adjusts the position of the casing 20 on the sleeve.

Thus, for uncoupling the runner from the impeller, the sleeve 26 is moved to the right in Figure 1, sliding on the shaft 2, and the disk valve 27, which moves with the sleeve, closes the ports 17, thereby retaining the accumulated oil within the storage chamber.

For shifting the slide sleeve longitudinally on the driven shaft in the manipulations of engaging and of disengaging the hydraulic coupling, I employ a friction brake, preferably of the cone type, which may be manually operated, or if necessary in heavy duty couplings, the brake may be operated by motive fluid force as oil or air, or by electro-magnetic power, under manual control.

Figures 3, 4:
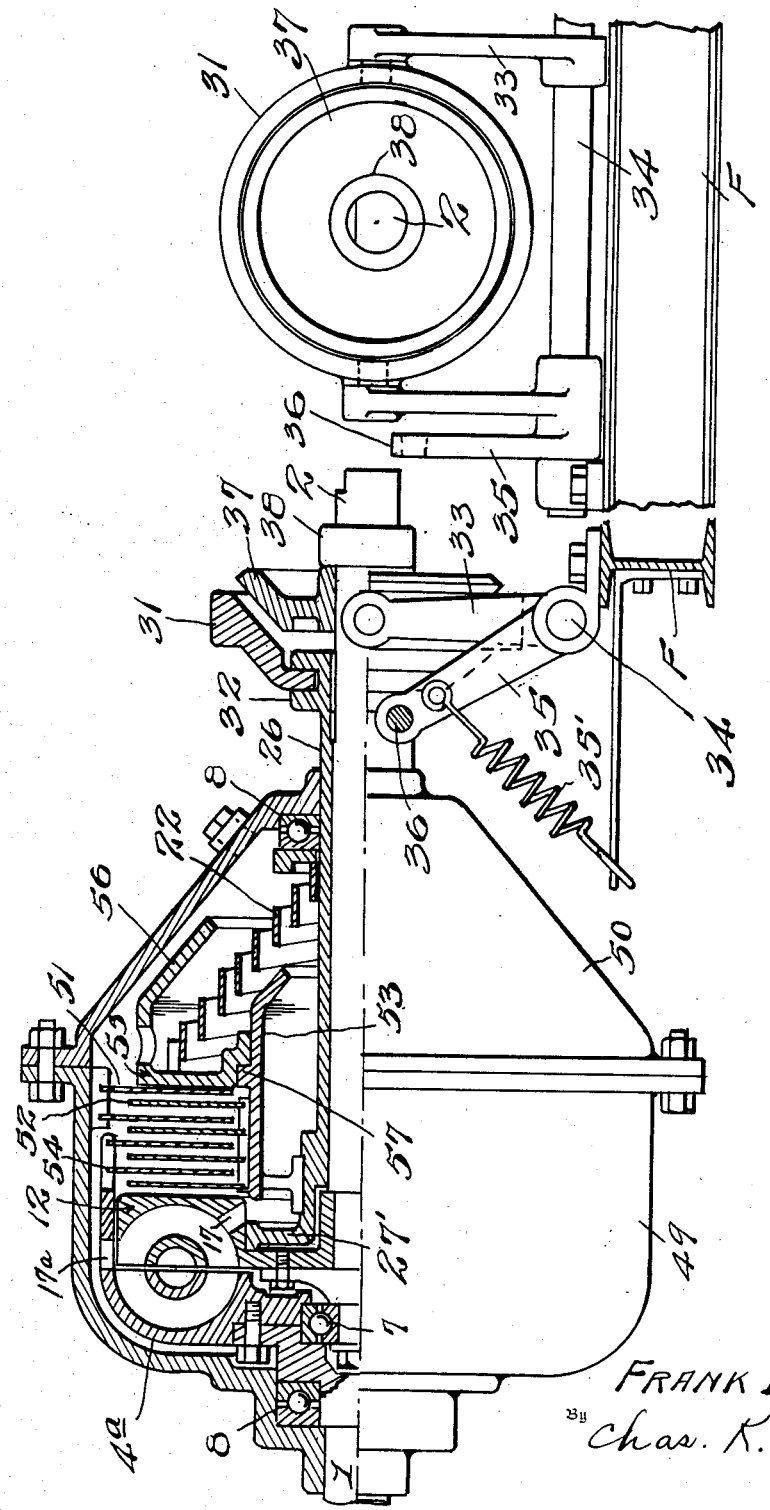
Figure 3 illustrates a further modification of the invention using a non-rotary exterior housing for the coupling.
Figure 4 is a view at the right end of Figure 3 illustrating the cone type of braking mechanism employed in the three forms of the coupling.

The friction brake, which is employed in Figures 1, 2, and 3, and also illustrated in Figure 4, includes a non-rotary, cone-shaped friction disk 31 mounted in suitable manner to cooperate with a head 32 that is keyed to and rigidly fastened on and revolves with the sleeve 26. The disk 31 and its retaining head 32 are thus adapted to slide with the sleeve 26 on the shaft 2, through the movement of a U-shaped yoke 33 in which the disk is pivoted, and the yoke is pivoted at 34 on a fixed frame member F. The yoke is swung on its pivot 34 through the brake lever 35, to the free end 36 of which a link is connected and extends to the control lever, not shown. The non-rotary disk 31 is thus brought into frictional contact with a complementary disk 37 mounted on and keyed to the shaft 2 to revolve therewith, a retaining collar or nut 38 being indicated as threaded on the shaft to back up the disk 37.

The longitudinal shifting, to the right, in Figure 1, of the transfer casing, which is decelerated or stopped, and the continued rotation of the impeller, causes oil to flow under centrifugal action, outwardly from the working chamber and into the transfer chamber or casing where the tapered wall of the casing guides the turbulent, but spent, oil into the storage chamber, the outlet ports 17 of which are closed. The application of power against the driven parts of the coupling is thus withdrawn, although the impeller still continues to revolve, and this withdrawal of power thereby reduces the resistance of the impelled parts to the friction applied by the brake, thus permitting the brake to effect a quick-action in either slowing down the speed of the impelled parts, or in arresting the rotation of the driven shaft 2.

The impeller thus performs the functions of a rotary pump to evacuate the working chamber and collect the motive fluid in the lower half of the coupling as well as in the storage chamber of the coupling, and while the impeller continues to revolve, the spent or de-energized motive fluid is prevented from returning back through the transfer casing to the working chamber of the coupling.

To again couple the runner with the impeller for transmission of power through the coupling from the drive shaft to the driven shaft, the control lever 35 is swung to the left, as in Figure 1, opening ports 17 so that the oil may flow to the revolving impeller from the storage chamber into the working chamber of the coupling, and as the valve ring 21 closes the ports 17', the oil is confined in the working chamber, and the runner is actuated with the impeller.

As is well known to those skilled in the art, the runner, under ordinary conditions, revolves at less speed than the impeller of hydraulic couplings now in use, causing a slippage between the impeller and the runner, and consequent inefficiency in the transmission of power through the coupling. To eliminate the slippage between the impeller and the runner, and thus increase the efficiency of the coupling, I provide an auxiliary interior friction clutch, as indicated in Figures 2 and 3, and the interior arrangement and construction of some of the parts within the housing are modified for this purpose.

In Figure 2 the outlet ports 17' from the working chamber correspond to the ports 17' of Figure 1, and the disk valve 27' controlling the ports 17 corresponds to the valve 27, while the housing 5 here shown as cylindrical is fashioned with a tapered section 5a for the spring 22. The interior friction clutch includes a set of circular, open center, thin plates 39 notched at their peripheries to engage laterally extending arms or surfaces 40 rigidly attached to or carried by the impeller 4, and the friction plates or disks 41, arranged alternately of the plates or disks 39, are also open center disks, notched at their inner peripheries and mounted on longitudinally extending ribs 42 on the exterior of the storage chamber 43. The disks of the two sets 39 and 41 are located between the runner and a presser plate or ring 44, which, at its outer side has a set of two, three, or more retaining lugs 45, each restraining a link 46 that extends radially, and at its outer end is pivoted at 47 in a lug fashioned on a wall of the inner or valve ring 21 of the transfer casing 20, and an actuating bolt 48 is pivoted at the approximate center of the disk 46. These bolts extend through tubular bosses of the transfer casing, and they are threaded and fastened in the spring ring 24 which retains the spring 22.

For convenience of illustration, a limited number of the friction disks 39 and 41 are shown, and it will be understood that a greater number are employed in actual practice if necessary, and further, it will be understood that two, three, or more links 46 are employed for engaging or disengaging the disks of the clutch. Due to the resiliency of spring 22, the spring ring 24 is urged to cause the actuating bolts to move the presser plate 44 the slight distance necessary for closing the alternate friction disks between the presser plate and the runner, to close the auxiliary friction clutch, and, of course, the clutch is opened when the exterior brake is applied.

In the modification of Figure 3, the exterior housing comprising the sections 49—50 is not directly attached to the impeller, and while the impeller and the housing may relatively rotate, they are indirectly connected by frictional engagement of the interior clutch. One shifting movement of the interior valve member 27' results in evacuation of the working chamber and transfer of oil to the storage chamber 53, to uncouple the impeller 4a from the runner 12, and reverse shifting to open position in Figure 3 results in flow of oil from the storage chamber through ports 17 to the working chamber.

In this coupling of Figure 3 the interior friction clutch plates 51 have an annular series of perforations near their outer peripheries to facilitate the flow of oil from the working chamber through ports 17a of the impeller 4a, and these plates are mounted on the interior of the housing section 49 for co-action with a series of plates 52 mounted on the exterior periphery of the storage casing 53, which casing is mounted, by the use of a suitable number of lugs 57 on the storage casing 53 which moves with the slide sleeve 26. Another series of alternating plates 54 is mounted to rotate with the impeller 4a as indicated, and the latter is provided with the ports 17a similar to ports 17'.

The spring 22 bears against a clutch flange 55 for frictional engagement of the friction clutch members, and this flange 55 or presser plate is also fashioned with an annular frusto-conical flange 56 conforming in shape to the inner face of the conical section 50 of the housing and adapted for use as an interior friction brake when the disks of the friction clutch are disengaged and the impeller and runner are disengaged or uncoupled.

The sleeve 26, as hereinbefore described, is keyed to slide on the shaft 2 under action of the exterior cone-brake and the sleeve carries with it the storage chamber 53 mounted thereon. The chamber has an exterior flange, or set of lugs, 57 that bear against the presser plate 55 to move the presser plate, not only to disengage the friction clutch members from the runner, but also to frictionally engage the brake surface 56 with the housing section 50. When the coupling is connected and operating, the spring 22 closes the friction clutch against the runner 12 for a driving connection with the driven shaft 2. When the brake clutch is applied by movement of the operating lever 35, the interior friction clutch is released, and the rotation of the housing is arrested by frictional engagement of member 56 with the housing-section 50.

The brake arm 35, as indicated, is provided with a spring 35' for returning the yoke 33 and the clutch member 31 to neutral position after the brake has been released.

Having thus fully described my invention, what I claim as new and desire to secure by Letters Patent is:

1. In a hydraulic coupling, the combination with a drive shaft, a housing having an impeller-section and rotatable with the shaft, and a driven shaft, of a runner rotatable with the driven shaft, a longitudinally movable transfer-casing having a valve member closing outlet ports from the working chamber formed between the impeller and the runner, and means for moving said transfer casing for evacuation of the working chamber.

2. In a hydraulic coupling, the combination with a drive shaft, a housing having an impeller-section and rotatable with the shaft, and a driven shaft, of a runner rotatable with the driven shaft and co-acting with the impeller-section to form a working chamber having peripheral outlet ports, a longitudinally movable transfer-casing having a valve-member closing said ports, resilient means for holding the transfer casing in closed position, and means for moving said transfer casing for evacuation of the working chamber.

3. In a hydraulic coupling, the combination with a drive shaft, a housing and an impeller rotatable with the shaft, and a driven shaft, of a runner rotatable with the driven shaft and co-acting with the impeller to form a working chamber having a set of outlet ports and a set of inlet ports, a longitudinally movable valve-member within the housing closing the outlet ports, means for moving said valve-member for evacuation of the working chamber, and means centrally located movable with and concentric with the valve-member for closing the inlet ports.

4. In a hydraulic coupling the combination with an impeller and a runner forming a working chamber having outlet ports and inlet ports, of an inner annular longitudinally movable valve-member closing the outlet ports, means for shifting said valve-member, and a valve-member concentric with and movable with the first valve-member for closing the inlet ports, when the outlet ports are opened for evacuation of the working chamber.

5. In a hydraulic coupling, the combination with a rotatable housing, an impeller rigid with the housing and having an inner transverse peripheral plane face and a runner forming a working chamber having outer outlet ports adjacent said face and inner inlet ports, of a longitudinally movable, spring-pressed valve-member within the housing, in operative contact with said faces and closing the outer ports, means for shifting said valve member to open the outer ports, and a valve-member movable with the first valve-member for closing the inlet ports when the outlet ports are opened for evacuation of the working chamber.

6. In a hydraulic coupling, the combination with a drive shaft, a housing and an impeller rotatable with the drive shaft, and a drive shaft, of a runner rotatable with the driven shaft and co-acting with the impeller to form a working chamber having exterior outlet ports, a casing rotatable with the runner and forming a storage chamber having ports to the working chamber, a longitudinally movable valve-member closing the outlet ports, and a valve-member movable with the first valve member for closing the storage-chamber ports when the outlet ports are opened for evacuation of the working chamber.

7. In a hydraulic coupling, the combination with a drive shaft, a housing and an impeller rotatable with the drive shaft, and a driven shaft, of a runner having a series of outlet ports within the housing and rotatable with the driven shaft, said runner co-acting with the impeller to form a working chamber having outlet ports, a longitudinally movable valve-member within the housing and closing said ports, means for shifting said valve-member for evacuation of the working chamber, and means for arresting the rotation of the driven shaft.

8. In a hydraulic coupling, the combination with a drive shaft, a housing and an impeller rotatable with the drive shaft, and a driven shaft, of a runner having a series of outlet ports within the housing and rotatable with the driven shaft said runner co-acting with the impeller to form a working chamber having outlet ports, a longitudinally movable, spring-pressed valve member within the housing and rotatable with the driven shaft and closing said ports, means for shifting said valve member for evacuation of the working chamber, and means for arresting the rotation of the driven shaft.

9. In a hydraulic coupling, the combination with a drive shaft, a housing and an impeller rotatable with the shaft, and a driven shaft, of a runner rotatable with the driven shaft and co-acting with the impeller to form a working chamber having outlet ports, a slide sleeve rotatable with the driven shaft, a valve member rotatable with said sleeve and closing said ports, a brake member mounted on the sleeve and means for actuating said member, and a complementary brake member mounted on the driven shaft.

10. In a hydraulic coupling, the combination with a drive shaft and an impeller rotatable with the shaft, and a driven shaft, of a runner rotatable with the driven shaft and co-acting with the impeller to form a working chamber having a set of outlet ports and a set of inlet ports, a longitudinally movable interior casing and a valve member movable therewith for closing the inlet ports, a slide sleeve on the driven shaft rigid with said casing and valve member and rotatable with the driven shaft, and means for sliding said sleeve.

11. In a hydraulic coupling, the combination with a drive shaft and its impeller, a driven shaft and its runner, said impeller and runner forming a working chamber having outlet ports and said runner having inlet ports to said chamber, of a slide sleeve on the driven shaft, a valve for said inlet ports and a storage chamber both rigid with said sleeve, means for sliding the sleeve for evacuation of the working chamber, and means for arresting the rotation of the driven shaft.

12. In a hydraulic coupling, the combination with a housing, a drive shaft and its impeller, a driven shaft and its runner, said impeller and runner forming a working chamber having outlet ports and said runner having inlet ports to the working chamber, of a slide sleeve rotatable with the driven shaft and a valve carried by said sleeve to control the inlet ports, means for sliding the sleeve, and means rigid with the sleeve for frictional engagement with the housing to arrest rotation of the driven shaft.

FRANK B. YINGLING.